(12) United States Patent
Thurner

(10) Patent No.: US 6,283,172 B1
(45) Date of Patent: Sep. 4, 2001

(54) DEVICE FOR REPAIRING A TIRE FAULT

(75) Inventor: Helmut Thurner, Bad Griesbach-Reuthen (DE)

(73) Assignee: Alusuisse Bayrisches Druckguss-Werk GmbH Co. KG, Markt Schwaben (DE)

( * ) Notice: Subject to any disclaimer, the term of this patent is extended or adjusted under 35 U.S.C. 154(b) by 0 days.

(21) Appl. No.: 09/297,988

(22) PCT Filed: Sep. 11, 1998

(86) PCT No.: PCT/EP98/05807

§ 371 Date: May 11, 1999

§ 102(e) Date: May 11, 1999

(87) PCT Pub. No.: WO99/14031

PCT Pub. Date: Mar. 25, 1999

(30) Foreign Application Priority Data

Sep. 12, 1997 (DE) .......................................... 297 16 453 U

(51) Int. Cl.[7] ........................................................ B65B 31/00
(52) U.S. Cl. ................................ 141/38; 141/41; 141/67; 141/114; 141/313; 141/382; 152/415; 222/386.5; 222/389
(58) Field of Search ................................... 141/38–41, 67, 141/311 R, 313, 314, 114, 329, 348, 349, 382, 387, 388; 222/386.5, 389, 399; 152/415

(56) References Cited

U.S. PATENT DOCUMENTS

| | | | |
|---|---|---|---|
| 2,415,019 | * 1/1947 | McMahan | 152/415 |
| 2,812,783 | 11/1957 | Bufogle . | |
| 5,251,787 | * 10/1993 | Simson | 222/95 |
| 5,312,018 | * 5/1994 | Evezich | 222/95 |
| 5,403,417 | 4/1995 | Dudley et al. | 156/97 |
| 5,908,145 | * 6/1999 | Jaksa | 222/394 |

FOREIGN PATENT DOCUMENTS

| | | |
|---|---|---|
| 4009705 | 5/1932 | (DE) . |
| 19 01 328 U | 9/1964 | (DE) . |
| 26 09 003 A1 | 9/1976 | (DE) . |
| 8706265 | 8/1987 | (DE) . |
| 36 41 416 A1 | 6/1988 | (DE) . |
| 2629438 | 10/1991 | (DE) . |
| 0753420 | 1/1997 | (EP) . |
| 725829 | 11/1957 | (FR) . |
| 2208313 | 6/1974 | (FR) . |
| 2638966 | 5/1990 | (FR) . |
| 26 91 101 A1 | 5/1992 | (FR) . |

* cited by examiner

Primary Examiner—Timothy L. Maust
(74) Attorney, Agent, or Firm—Weingarten, Schurgin, Gagnebin & Hayes LLP

(57) ABSTRACT

A device for repairing a tire fault by injecting repair liquid into the faulty tire, said liquid being present in a compressible liquid storage volume (100). Said volume (100) is sealed in such a way that it is watertight at at least one first sealing point (60) to be opened and is located in a pressurized container (56). Said pressurized container is subjected to the pressure of a pressurized gas from a pressurized gas source (28) in a compression chamber which becomes larger as it is affected by the pressurized gas. When the first sealing point (60) is opened, the volume (100) delivers repair liquid to the tire (12) through the opened first sealing point (60) be extracted from the volume. The pressure then drops in a chamber (58) arranged above the pressurized container (56), the pressure difference between the pressurized gas delivery channel (46, 54) and this chamber (58) increasing and causing at least one second sealing point (62) to open, said second sealing point being between the delivery channel (46, 54) and the chamber (58), thereby clearing the channel leading through the flexible delivery tube (16), from the pressurized gas source (28) to the tire (12).

18 Claims, 4 Drawing Sheets

Figure 1:
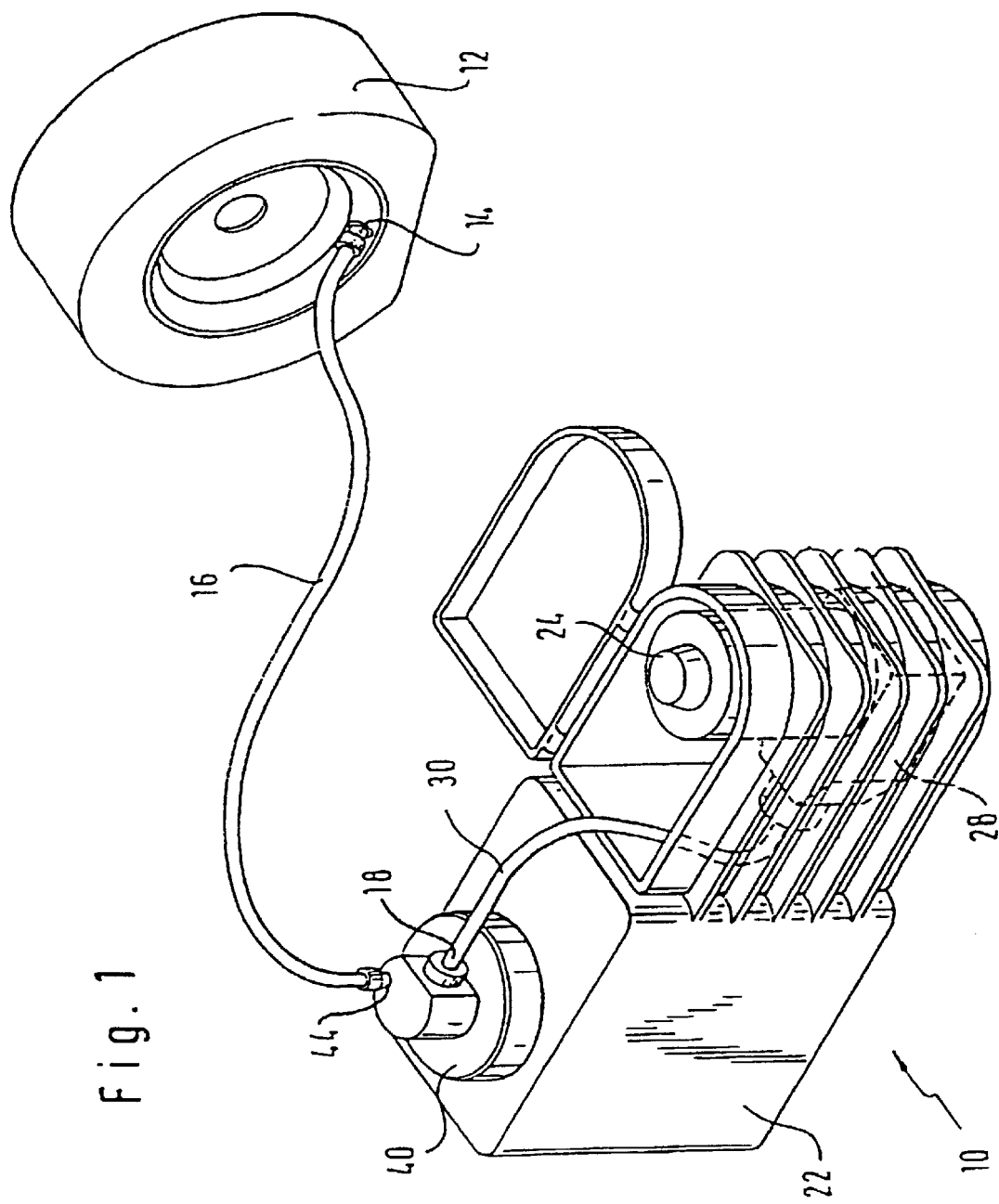

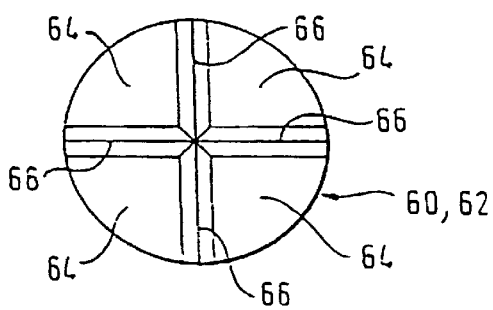
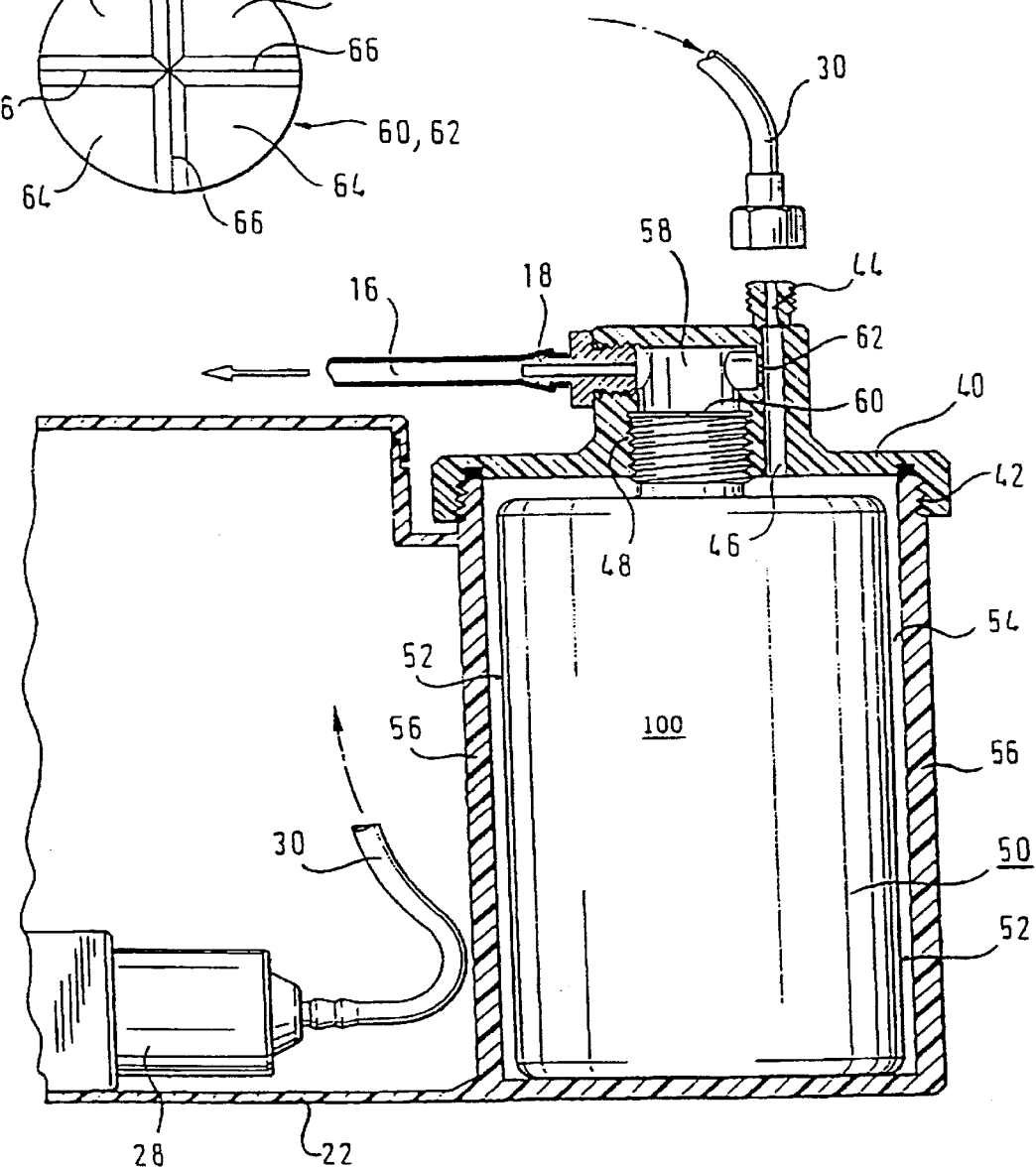

DEVICE FOR REPAIRING A TIRE FAULT

The present invention relates to a device for repairing a tire fault by injecting repair liquid into the faulty tire, said liquid being present in a compressible liquid storage volume.

Devices of this kind are known. They are taken along in a vehicle with or, preferably, without spare tire.

The majority of tire faults is caused by penetration of sharp objects, such as nails or broken glass or similar, into the cap of the tire. Thanks to a considerable quality improvement for tires, even these punctures have become rare. Therefore, one has considered to do without spare tires or even emergency tires at all. Doing this, space may be saved in the vehicle, or the saved space may rather be used for transportation volume. This is especially applicable to compact or small vehicles or for sports cars. When a space-saving repair set is carried along instead of a spare tire, and with which the driver of the vehicle may help himself in case of a tire fault, without being compelled to dismount in situ the wheel with the damaged tire, there is no need to accordingly carry along other tools intended for tire replacement nor an autolifter. All this leads to considerable weight saving.

The devices or repair sets, respectively, known until now yet are not user-friendly enough. The repair is carried out following the possibly necessary removal of the damaging part from the tire surface by means of a repair or patching liquid which is introduced into the damaged tire. Subsequently, by means of a small compressor being part of the repair set, said compressor may be electrically driven from the on-board vehicle supply, the repair liquid will be hardened with pressure and the repaired tire inflated. Doing this, the wheel with the repaired tire may remain on the vehicle. During the repair process, however, the vehicle should be moved over some meters in order to spread the repair liquid in the tire.

A known device for the repair of tire faults or a known repair set, respectively, consists of separate loose parts brought together. The repair liquid is in a bottle which may be compressed manually, and it is thus filled into the tire via a flexible delivery tube. For this procedure, the tire valve must be removed and re-inserted subsequently. Superfluous patching means must be drawn off if necessary. The tire is inflated in the above-described manner.

Indeed, another repair set is put together in a box and the filling and inflating may be carried out continuously. The repair liquid thereby is in a pressure-resistent metal bottle, said bottle, however, being heavy. By means of the small compressor, which is also built into the repair set box, it is evacuated into the tire via a flexible delivery tube by introducing pressurized gas into the metal box. In this bottle, an ascending pipe may be found. As soon as said pipe does no longer sense liquid, the pressurized gas will be led into the tire. Hereby it is necessary that the metal bottle remains vertical. The operation is position-dependent. Furthermore, a return valve is necessary with this kind of operation. Additionally, the bottles must be cleaned after use, before being re-filled again. Moreover, each metal bottle must be replaced every two to three years, even if it had not been used. The bottles must also be cleaned and re-filled again when they are replaced. In addition to the weight, high costs arise with the use of this repair set.

Opposed thereto, the present invention is based on the object to provide a device for repairing a tire fault of the initially described kind, which has low weight, is cheap and assures a user-friendly use.

For fulfilling this task, a device is provided according to the characteristics of the independent claim 1.

Advantageous realizations are described in the subclaims.

The object of the invention takes up again the known compressible bottles with repair liquid. According to the invention, however, these will not be manually compressed, the liquid storage volume, however, containing the repair liquid, is sealed in such a way that it is watertight at at least one first sealing point to be opened, and is located in a pressurized container, said pressurized container being subjected to the pressure of a pressurized gas from a pressurized gas source in a pressurized chamber which becomes larger as it is affected by said pressurized gas, and that the first sealing point is opened, the volume delivering repair liquid to the tire through the opened first sealing point and via the flexible delivery tube until no more liquid is delivered, the pressure then drops in a chamber arranged above the pressurized container, the pressure difference between a pressurized gas delivery channel and the chamber increases and, due to the increased pressure difference, causes at least one second sealing point to open, said second sealing point being arranged between the delivery channel and the chamber, clearing a channel leading through the flexible delivery tube from the pressurized gas source to the tire.

In an advantageous manner, the repair process proceeds by itself continuously and may be simply handled even by a non-expert. Hereby, the device is absolutely position-independent.

In one advantageous realization of the invention the first sealing point is opened by affecting the compression chamber by pressure and the resulting compression of the volume. Thereby happens an automatic opening of the first sealing point without the necessity to use further devices. This means on one hand, that the device as a whole may be realized in lower weight and cost.

According to another realization of the invention it is likewise possible that the first sealing point and/or the second sealing point is manually, mechanically, electrically, pneumatically or hydraulically controlled and opened or closed, respectively.

Figure 2:
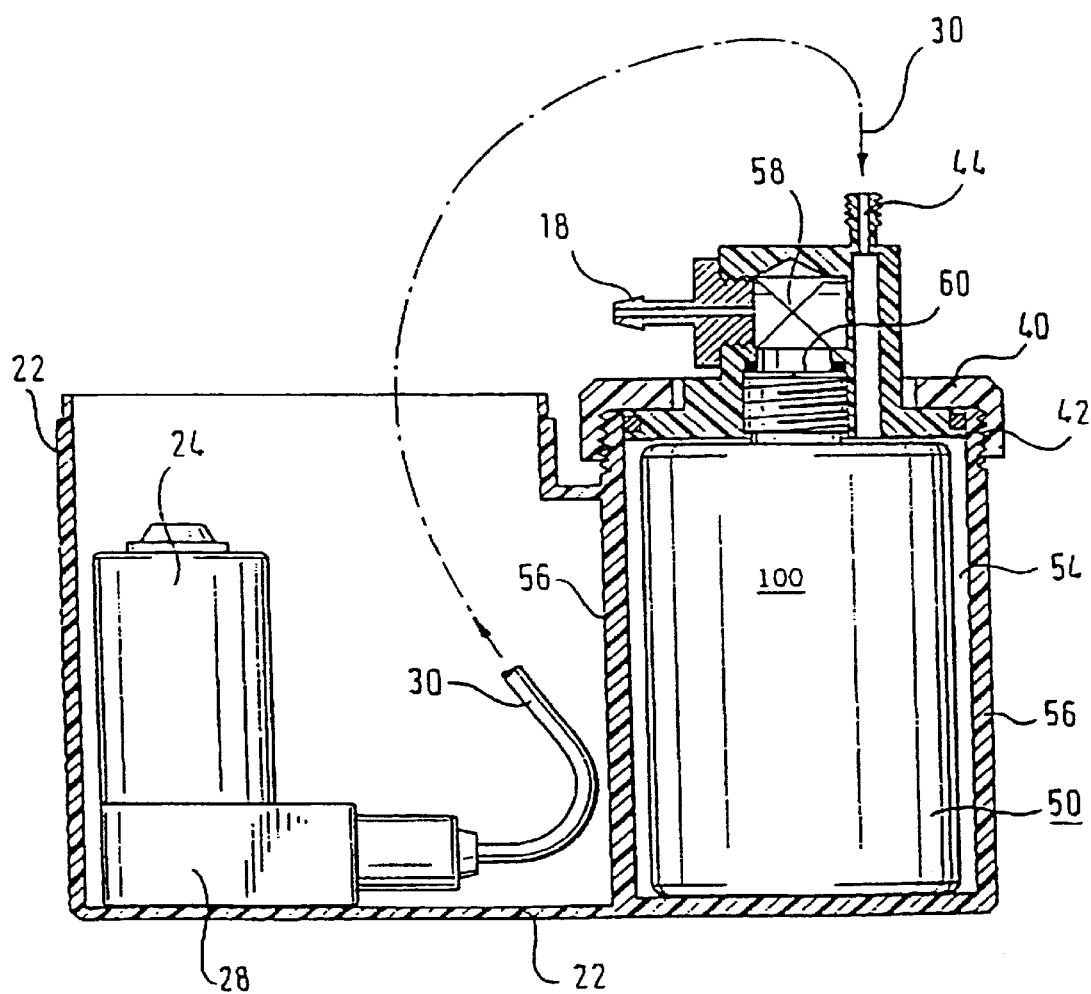
Figure 5:
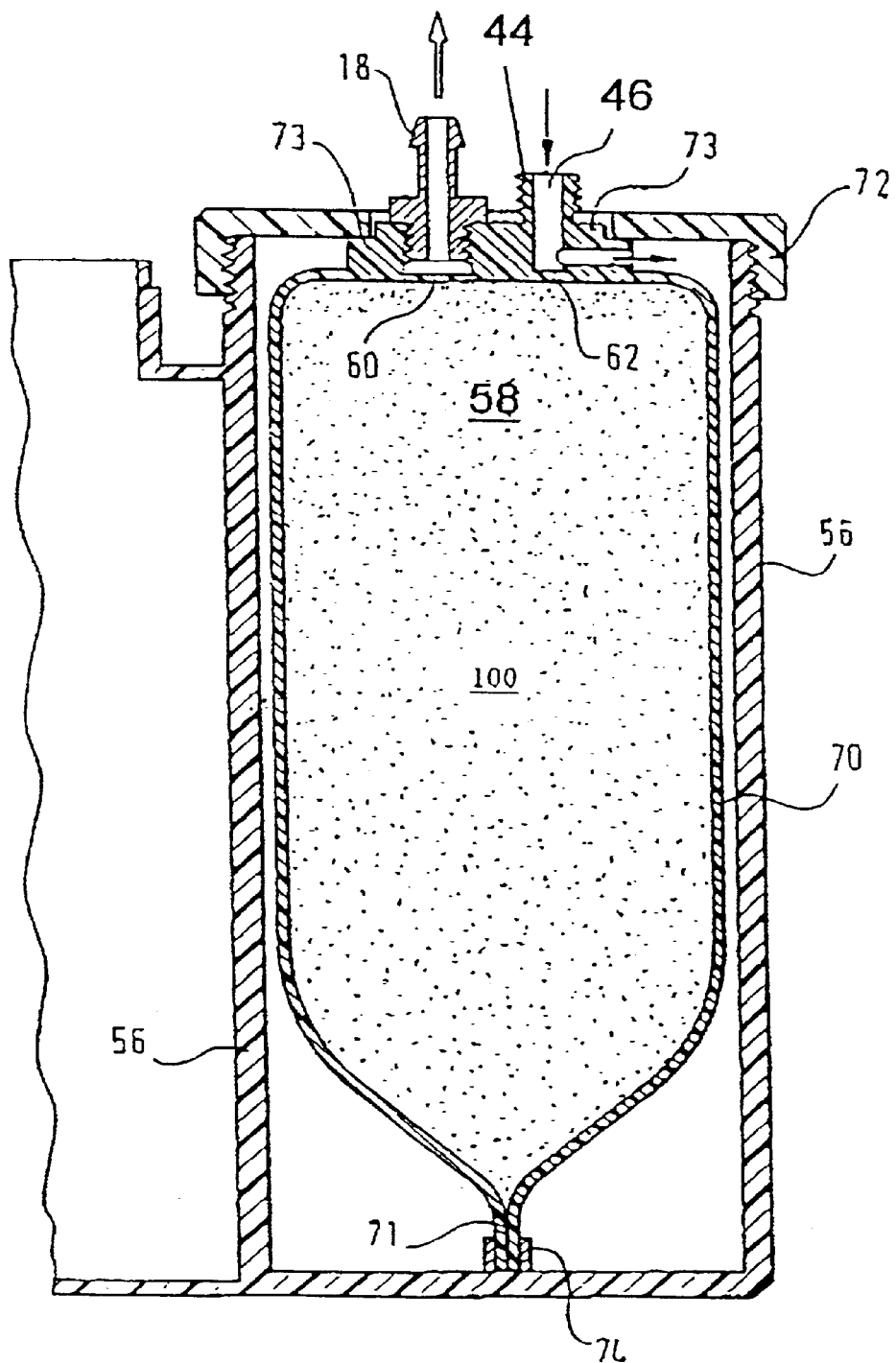

Further details, characteristics and advantages of the invention result from the following description of several embodiments described in the figures, in which:

FIG. 1 is a schematic perspective illustration of the device for repairing a tire fault according to the invention during its application, FIG. 2 is a schematic illustration of the device according to the invention, FIG. 3 is a schematic detail illustration of the device according to the invention according to FIG. 2, FIG. 4 is a schematic detail illustration of a sealing point of a device according to the invention, and FIG. 5 is a schematic illustration of another realization of the device according to the invention.

From the schematic illustration of FIG. 1 can be seen the application known in itself of a device 10 for repairing a tire fault. In a box 22 of the device 10 is a replaceable volume 100, in this and in the embodiments shown in FIGS. 2 and 3 is a bottle 50, containing tire repair liquid in a pressurized container 56. The pressure which is needed for the operation, is generated by means of a small compressor 28, which may be driven by an electrical motor 24, driven by the electrical on-board supply of a vehicle. By means of the gas pressure generated by the compressor 28, the tire repair liquid will be introduced into a tire 12 that has to be repaired via a flexible delivery tube 16, as will be described later, said tire being able to remain on the car during the repair operation FIG. 2.

FIG. 2 shows a schematic illustration of the device 10, FIG. 3 a schematic detail illustration of the device according to FIG. 2.

Inside the box 22 is a solid pressurized container 56, in which the volume 100, that is configured here as a bottle 50, will be inserted. The bottle 50 consists of a solid, but flexible material, that may easily be compressed. From the state of the art such compressible bottles filled with repair liquid are known. According to this state of the art, said bottles are manually compressed, and the liquid is such introduced into the tire that is to be repaired.

According to the present invention, said bottle 50 known in itself will be modified. Below a cover, which closes the bottle 50 above a screw thread 48 during normal state or transport, a thin membrane which also seals in a tight manner, is arranged as a first sealing point 60. In the present embodiment is shown how the bottle 50 without transport cover is firmly screwed in a top cover 40 with the screw thread 48 Hereby, the top cover 40 replaces the transport cover not shown in the drawings.

Said cover 40 will be connected to the pressurized container 56 in a pressure-tight and watertight manner, for example by means of a further screw-type cap 42 The dimensioning is such that the pressurized container 56 in its lateral peripheral inner circumference is slightly larger than the circumference of the bottle 50. There also exists a distance to the upper border of the bottle 50 on top, below the top cover 40. Thereby, a compression chamber 54 is built. This compression chamber 54 will be connected in the top cover 40 via a channel 46 to a gas inlet 44, and via a channel 30 to the pressure side of the compressor 28 When the motor of the compressor 28 is switched on, for example by connecting the electromotor 24 with the on-board vehicle supply, pressurized gas will be introduced into the compression chamber 54, whereby the bottle 50 will be compressed. Due to this outer pressure, sealing point 60 bursts and the repair liquid will be transported through a chamber 58 in the top cover 40 via a flexible tube 16 into the damaged tire 12, and namely until the bottle 50 has delivered its contents to the tire 12.

Following this, the compressor 28 continues to work. Thereby, the pressure in chamber 58 located above the pressurized container 56 drops, and the pressure difference between a delivery path or channel 46 for the pressurized gas and chamber 58 increases, so that a second sealing point (62) to be opened located between the delivery path or channel 46 and the chamber 58, is opened due to the increased difference of pressure, and clears a passage from the pressurized gas source 28 via the flexible delivery tube 16 to the tire 12. The second sealing point 62 may be realized about four times as stable as the first sealing point 60. Thereby, the repair liquid is directly introduced into the tire 12 in a simple and automatic manner without changing of tubes, thereby fulfilling a further requirement, namely to press the repair liquid onto the inner wall of the damaged tire and to harden it there immediately after its introduction.

Subsequently, the repaired tire 12 will be inflated by means of the sustained pressure. Hereby, the position of the box 22 and the bottle 50 located therein is of no importance. The bottle 50 need not be kept vertically.

Therewith, the repair operation is finished, and the device must be regenerated for a further repair operation. In order to become operational again, a new bottle 50 containing repair liquid and a new sealing point 60 will be inserted during a visit in a garage or a service station. Top cover 40 as well, together with the flexible tube 16, must be replaced by a new cover comprising a new tight sealing point 62. This is a simple operation, since the parts that must be replaced, can be produced from synthetic material that can be recycled.

In further embodiments not shown in the drawing, the volume 100 may consist of a compressible container which is at least partially flexible, e.g. of a bubble reservoir or of a piston chamber defined by a cylinder and a piston, or of a tube of flexible, watertight material.

The first sealing point 60 and/or the second sealing point 62, moreover, may be manually, mechanically, electrically, pneumatically or hydraulically controlled and opened or closed, respectively.

Furthermore, the second sealing point 62 may be arranged in an arbitrary place in the wall of volume 100.

Sealing points 60, 62 are shown in detail in FIG. 4. It is of no importance if sealing point 60 or 62 is concerned. In both cases of the present embodiment, a membrane-like, round surface is concerned, consisting of an initially tear-resistent material that yields upon a certain predetermined pressure. The yielding takes place along several radial tearing lines 66, such that, following the burst or blow of the sealing point 60, 62, several lobes 64 remain stuck to the border and cannot mingle with the repair liquid in the form of disturbing material remainders. Instead of a plastic foil, for example, an aluminium foil may be used, the crackings of which are predetermined by a laser treatment.

The first sealing point 60 and/or the second sealing point 62 may also be realized as a valve (not shown).

The first sealing point 60 and/or the second sealing point 62 may also be opened by means of a cutting device (not shown). Thereby, the cutting device may be realized as a hollow cutting edge or pointed screw or arrowhead.

A further embodiment of the invention results from FIG. 5. According to this embodiment, the repair liquid is in a tube 70, which is closed with a fold 71 on the bottom and a connection part 73 on the top. Said connection part 73 comprises the gas inlet 44 and the flexible tube connection 18. The flexible tube connection 18 is connected towards the inner chamber of the tube 70 with the above described sealing point 60, and the second sealing point 62 can also be found in this part 73, which is firmly connected with the tube 70 Tube 70 will be inserted in the pressurized container, whereby the fold 71 may be provided with a rail 74 for additionally securing tube 70. In this case, the pressurized container on its top is connected to a cap nut 72, which seals the pressurized container and supports the connection part 73.

According to another variant, the connection part 73 may also be firmly attached to the cap nut 72.

The repair process is carried out similarly to the above decribed method. The gas delivered by compressor 28 first reaches the pressurized container 56 via the gas inlet 44 and compresses the inserted tube 70 in a way that the first sealing point 60 bursts and the contents of tube 70 are conveyed into tire 12. When tube 70 is completely pressed empty and the lasting pressure is further delivered, the second sealing point 62 bursts in its turn, which, however, opens into the inner volume of tube 70 according to this embodiment. Thereby, tube 70 rapidly expands again, and the further delivered gas is transmitted via sealing point 60 still open and connection 18 to tire 12, and exercises there the hardening and filling function of tire 12 thereby repaired. The advantage of the second embodiment compared to the first embodiment is that the replacement of tube 70 and the connection part 73 put on, is easier than the replacement of the above described bottle 50.

Device 10 is basically suitable for repairing leakages in gas and/or fluid containers.

What is claimed is:

1. Device for repairing a tire fault by injecting a repair liquid into the faulty tire, said liquid being present in a compressible liquid storage volume, characterized in that (i) the liquid storage volume includes a watertight first sealing point to be opened and is located in a pressurized container subject to the pressure of a pressurized gas from a pressurized gas source in a compression chamber which becomes larger as it is affected by the pressurized gas, (ii) the first sealing point is disposed between the liquid-containing volume and a flexible delivery tube and is opened in response to the pressure of the pressurized gas source such that the volume delivers repair liquid to the tire through the opened first sealing point via the flexible delivery tube until no more liquid can be extracted, and (iii) the pressure in a chamber arranged above or in the pressurized container subsequently is dropping, and the pressure difference between the pressurized gas delivery channel and the chamber is rising, such that a second sealing point located between the delivery channel and the chamber is opened and clears a channel from the pressurized gas source via the flexible delivery tube to the tire.

2. Device according to claim 1, characterized in that said first sealing point is opened by applying pressure to the compression chamber and the resulting compression of the volume.

3. Device according to claim 1, characterized in that at least one of the first sealing point and the second sealing point are manually, mechanically, electrically, pneumatically or hydraulically controlled and opened or closed, respectively.

4. Device according to claim 1, characterized in that the volume is a bottle made of flexible, watertight material.

5. Device according to claim 1, characterized in that the volume is replaceable.

6. Device according to claim 1, characterized in that at least one of the first sealing point and the second sealing point is realized as a valve.

7. Device acccording to claim 1, characterized in that at least one of the first and the second sealing point consist of a membrane firmly connected to their border, comprising tear lines orientated to the center, the opening of the sealing points taking place along said tear lines and intermediate lobes remain connected to the border.

8. Device according to claim 1, characterized in that the pressurized gas source comprising an electric motor and the pressurized container are housed in a box, the pressurized gas source being connected with the pressurized container via a channel, and that only an electric lead and the flexible delivery tube are led out from the box.

9. Application of a device according to claim 1 for repairing leakages in gas and/or liquid-containing receptacles.

10. Device according to claim 1, characterized in that the volume consists of an at least partially flexible compressible container.

11. Device according to claim 10, characterized in that the volume consists of a bubble reservoir.

12. Device according to claim 10, characterized in that the tube has a connection part connected to it, in which the first, as well as the second sealing point and the connections for the inlet and delivery of the pressurized gas to the tire are arranged, the pressurized gas being initially led into the compression chamber past the second sealing point, and, following the evacuation of the tube and the opening of the second sealing point, is then delivered to the tire through the tube.

13. Device according to claim 1, characterized in that the volume is a tube made of flexible, watertight material.

14. Device according to claim 13, characterized in that the tube has a connection part connected to it, in which the first, as well as the second sealing point and the connections for the inlet and delivery of the pressurized gas to the tire are arranged, the pressurized gas being initially led into the compression chamber past the second sealing point, and, following the evacuation of the tube and the opening of the second sealing point, is then delivered to the tire through the tube.

15. Device according to claim 1, characterized in that the second sealing point is realized in a wall of the volume.

16. Device according to claim 15, characterized in that at least one of the first sealing point and the second sealing point is realized as a valve.

17. Device according to claim 1, characterized in that at least one of the first sealing point and the second sealing point is realized as a membrane.

18. Device acccording to claim 17, characterized in that at least one of the first and the second sealing points consist of a membrane firmly connected to their border, comprising tear lines orientated to the, center, the opening of the sealing points taking place along said tear lines and intermediate lobes remain connected to the border.

* * * * *

UNITED STATES PATENT AND TRADEMARK OFFICE
CERTIFICATE OF CORRECTION

PATENT NO. : 6,283,172 B1
DATED : September 4, 2001
INVENTOR(S) : Helmut Thurner It is certified that error appears in the above-identified patent and that said Letters Patent is hereby corrected as shown below:

Title page,
Item [30], Foreign Application Priority Data, "297 16 453 U" should read
-- 297 16 453.8 --;

Item [57], ABSTRACT,
Insert the following new paragraph:

-- A device for repairing a tire fault injects repair liquid into the faulty tire, the liquid being present in a compressible liquid storage volume. The volume is sealed in such a way that it is watertight at at least one first sealing point to be opened and is located in a pressurized container. The pressurized container is subjected to the pressure of a pressurized gas from a pressurized gas source in a compression chamber which becomes larger as it is affected by the pressurized gas. When the first sealing point is opened, the volume delivers repair liquid to the tire through the opened first sealing point via a flexible delivery tube until no more liquid can be extracted from the volume. The pressure then drops in a chamber arranged above the pressurized container, so that the pressure difference between the pressurized gas delivery channel and this chamber increases. This increased pressure difference causes at least one second sealing point between the delivery channel and the chamber to open, thereby clearing the channel leading through the flexible delivery tube from the pressurized gas source to the tire. --;

Column 2,
Line 68, "operation FIG 2." should read -- operation. --;

Column 3,
Line 19, "48 Hereby" should read -- 48. Hereby --;
Line 23, "42 The" should read -- 42. The --;
Line 31, "28 When" should read -- 28. When --; and

UNITED STATES PATENT AND TRADEMARK OFFICE
CERTIFICATE OF CORRECTION

PATENT NO. : 6,283,172 B1
DATED : September 4, 2001
INVENTOR(S) : Helmut Thurner It is certified that error appears in the above-identified patent and that said Letters Patent is hereby corrected as shown below:

<u>Column 4,</u>
Line 42, "70 Tube" should read -- 70. Tube --.

Signed and Sealed this

Nineteenth Day of November, 2002

Attest:

Attesting Officer

JAMES E. ROGAN
*Director of the United States Patent and Trademark Office*